W. MACK.
COMBINED PERCH AND TRAP.
APPLICATION FILED MAY 19, 1916.
1,209,462.
Patented Dec. 19, 1916.
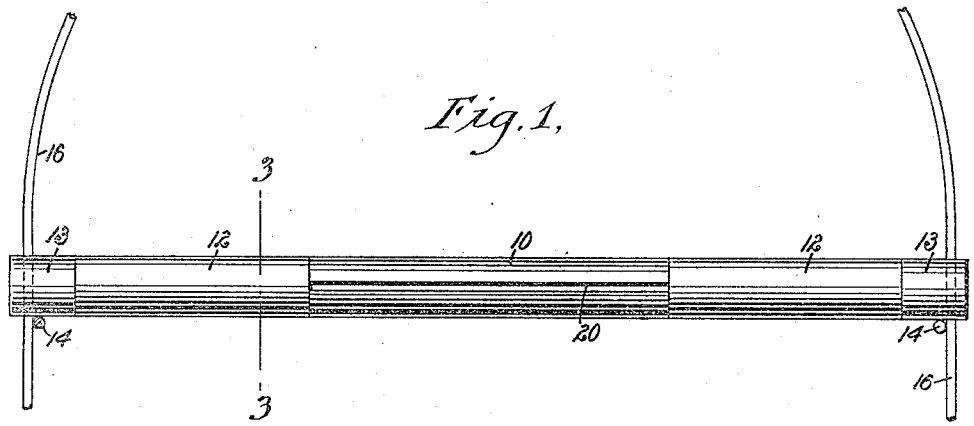
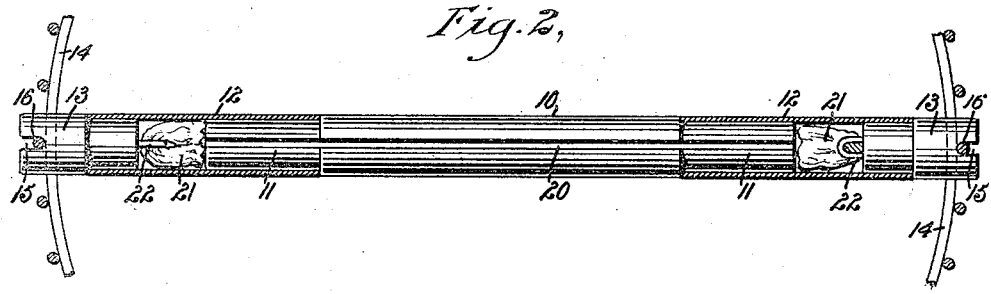
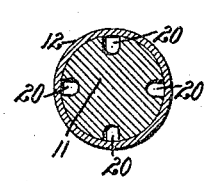
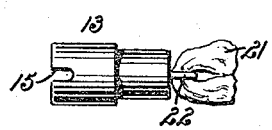
WITNESSES
Edw. Thorpe
Rev. G. Horkitz
INVENTOR
William Mack
BY
ATTORNEYS

UNITED STATES PATENT OFFICE.

WILLIAM MACK, OF NEW YORK, N. Y.

COMBINED PERCH AND TRAP.

1,209,462.

Specification of Letters Patent.

Patented Dec. 19, 1916.

Application filed May 19, 1916. Serial No. 98,593.

*To all whom it may concern:*

Be it known that I, WILLIAM MACK, a citizen of the United States, and a resident of the city of New York, borough of Manhattan, in the county and State of New York, have invented a new and Improved Combined Perch and Trap, of which the following is a full, clear, and exact description.

The object of the invention is to provide a new and improved combined perch and trap for use in bird cages, chicken coops, and other apparatus, and arranged to provide a convenient perch for the bird to rest on and to provide dark breeding chambers for lice and other mites to pass into from the bird while the latter is at rest on the perch, and which breeding chambers can be readily removed and cleaned periodically of the trapped mites.

In order to accomplish the desired result, use is made of a bar provided with a passage for the mites to travel in, a breeding chamber held on the bar and into which leads the said passage, and a loose nesting material held removable within the said breeding chambers.

A practical embodiment of the invention is represented in the accompanying drawings forming a part of this specification, in which similar characters of reference indicate corresponding parts in all the views.

Figure 1 is a side elevation of the combined perch and mite trap as applied to a bird cage; Fig. 2 is a sectional plan view of the same with the bar and stoppers shown in plan; Fig. 3 is an enlarged cross section of the same on the line 3—3 of Fig. 1; and Fig. 4 is a plan view of one of the stoppers with the loose nesting material held thereon.

The combined perch and trap consists essentially of a bar 10 provided with reduced ends 11 onto which fit tubular breeding chambers 12 closed at their outer ends by removable stoppers 13 adapted to rest on the horizontally disposed cage wire 14, as plainly indicated in Figs. 1 and 2. The outer ends of the stoppers 13 are provided with vertically disposed slots 15 adapted to engage two oppositely disposed vertical cage wires 16 to hold the perch against accidental displacement within the cage.

The bar 10 is provided with one or a number of longitudinally extending grooves 20 reaching from end to end and opening at their ends into the breeding chambers 12 containing loose nesting material 21 removably attached to loops or staples 22 driven into the inner ends of the stoppers 13. The loose nesting material 21 is preferably in the form of loose cotton and can be readily removed from the chamber when removing the corresponding stopper 13 to which the loose material is attached.

When the combined perch and mite trap is in position in the cage, chicken coop or like device, and a bird rests on the bar 10 then the lice or other mites can readily pass from the body of the bird down the legs and feet onto the bar 10 to finally reach the grooves 20, along which the lice or mites travel in order to eventually pass into the breeding chambers 12 and to the loose nesting material 21 in which the lice or mites prefer to breed. It is understood that lice and mites seek dark chambers and loose material for breeding purposes and both are provided in the perch and trap shown and described.

It will be noticed that the perch can be readily removed from time to time from the cage, chicken coop and the like, and then the chambers 12 can be pulled off the reduced ends 11 of the bar 10 and the stoppers 13 can be removed from the chambers. As the loose material is attached to the stoppers it is readily pulled out of the chambers. The said chambers can be readily cleaned of the lice and mites that may be in the same by blowing air through the same, and the loose material 21 can be readily removed from the staples 22 and burned together with the lice or mites that have nested therein. New pieces of loose material 21 can be readily placed in position on the staples 22 and then the stoppers 13 are replaced in the chambers 12 and the latter are again engaged with the reduced ends 11 of the bar 10. The perch and trap can now be readily placed within the cage, chicken coop or other device.

The combined perch and trap shown and described is very simple and durable in construction and can be cheaply manufactured and readily cleaned periodically of the lice and other mites trapped therein.

Having thus described my invention, I claim as new and desire to secure by Letters Patent:

1. A combined perch and mite trap, comprising a bar provided with a passage for the mites to travel in, a tubular breeding chamber held on the end of the bar and into which leads the said passage, the said breeding chamber projecting beyond the end of the bar and a loose nesting material held removable within the said breeding chamber at the end of the bar.

2. A combined perch and mite trap, comprising a bar provided with a passage for the mites to travel in, a breeding chamber held on the bar end into which leads the said passage, a stopper held removable on the outer end of the said breeding chamber, and a loose nesting material held on the said stopper and extending within the said breeding chamber.

3. A combined perch and mite trap, comprising a bar provided with passageways for the mites to travel in toward the ends of the bar, breeding chambers held at the ends of the bar and removable stoppers closing the outer ends of the chambers, and loose nesting material held on the inner ends of the stoppers and extending within the said chambers.

4. A combined perch and mite trap, comprising a bar provided with passageways for the mites to travel in toward the ends of the bar, breeding chambers held at the ends of the bar and removable stoppers closing the outer ends of the chambers and having their outer ends provided with diametrical slots adapted to engage the upright wires of a bird cage to support the combined perch and trap within the bird cage, and loose nesting material held on the inner ends of the stoppers and extending within the said chambers.

5. A combined perch and mite trap, comprising a bar provided with a passage for the mites to travel in, a breeding chamber held on the bar and into which leads the said passage, a stopper held removable on the outer end of the said breeding chamber, a loop held on the inner end of the said stopper, and a loose nesting material held on the said loop within the said breeding chamber.

6. A combined perch and mite trap, comprising a bar provided with a longitudinally extending groove in its surface reaching from end to end of the bar, and forming a passage for the mites to travel in, a tubular breeding chamber held on the end of the bar and into which leads the said passage, the said breeding chamber projecting beyond the end of the bar, a closure for the outer end of the breeding chamber, and a loose nesting material held within the projecting portion of the breeding chamber between the said closure and the end of the bar.

WILLIAM MACK.

Copies of this patent may be obtained for five cents each, by addressing the "Commissioner of Patents, Washington, D. C."